(No Model.) 2 Sheets—Sheet 1.
J. F. THEURER.
DEVICE FOR COOLING BEER.
No. 388,742. Patented Aug. 28, 1888.
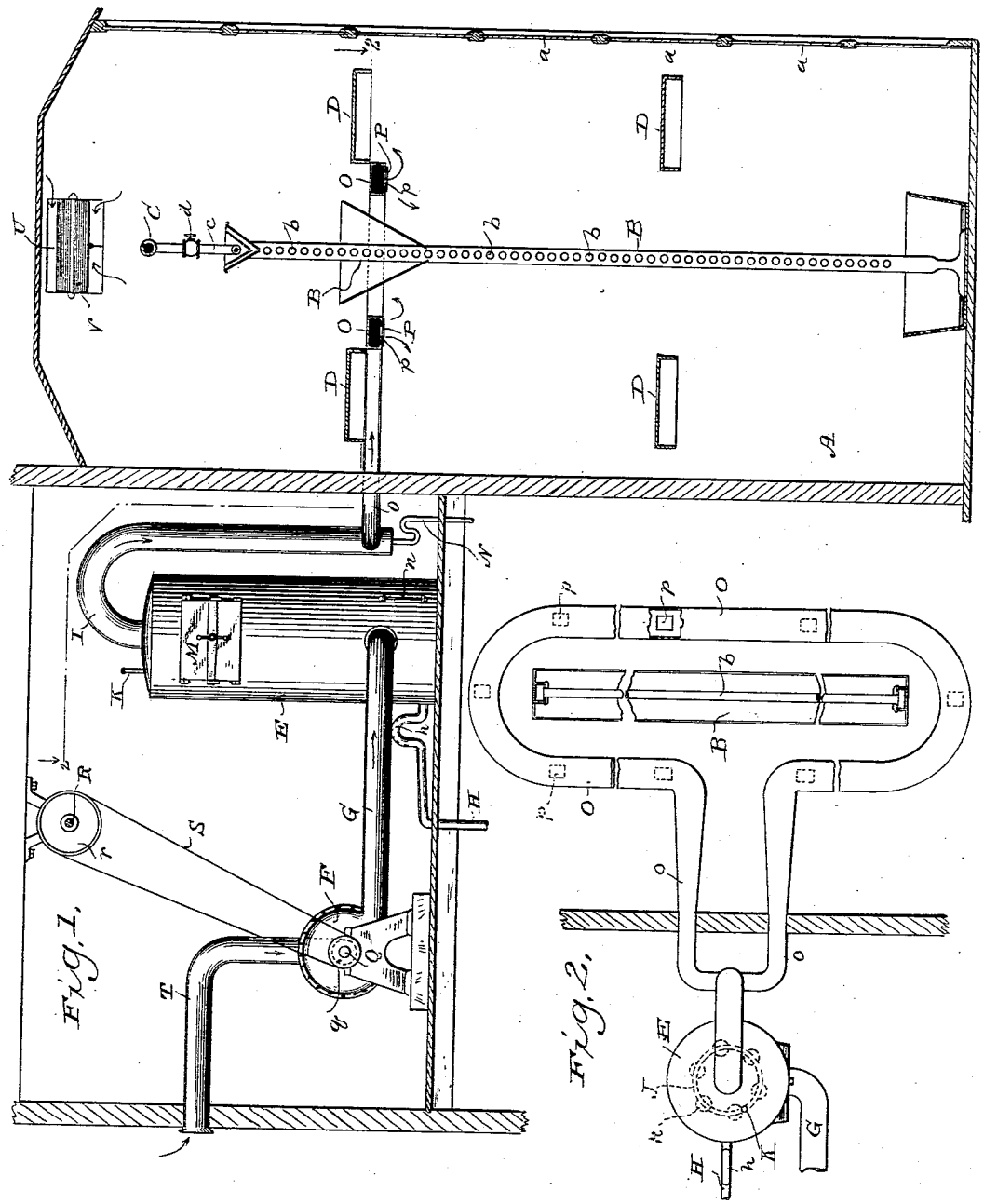

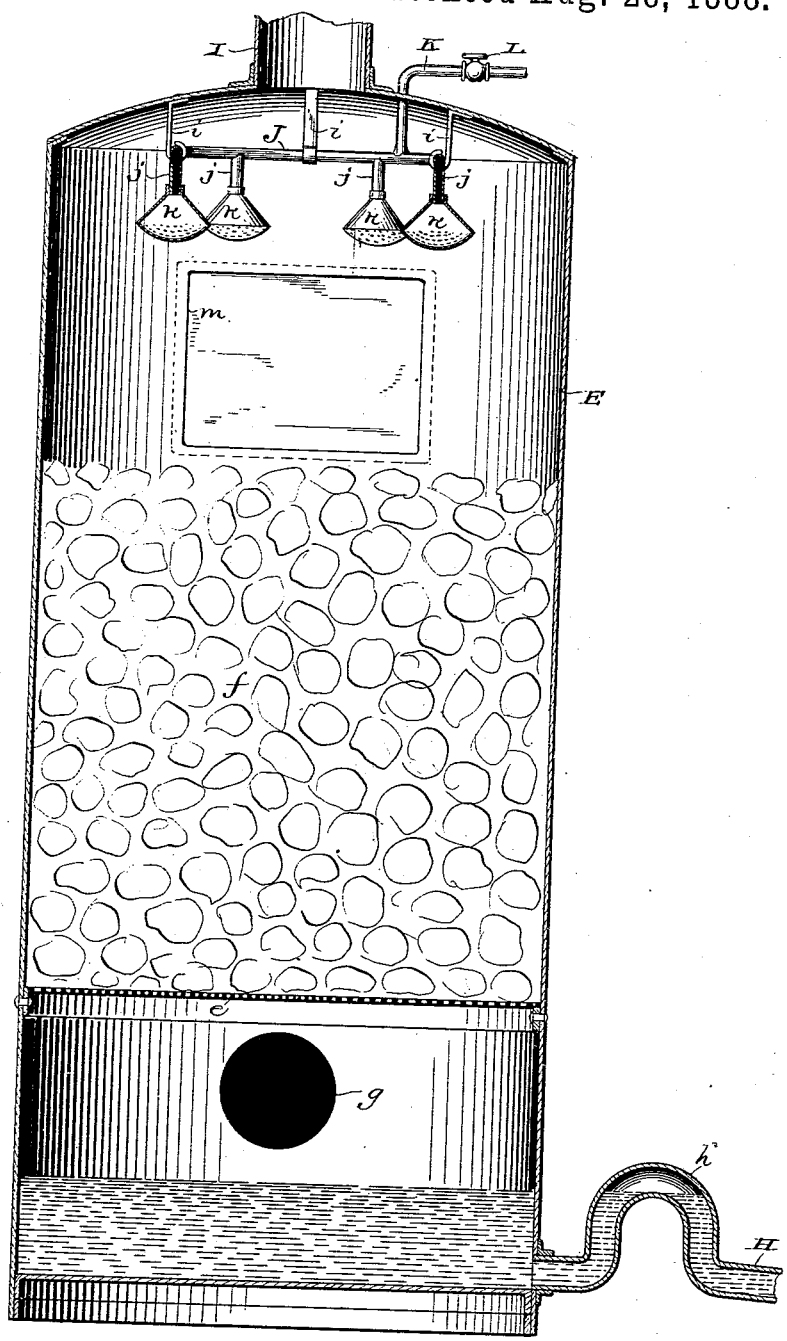

UNITED STATES PATENT OFFICE.

J. FRED THEURER, OF MILWAUKEE, WISCONSIN.

DEVICE FOR COOLING BEER.

SPECIFICATION forming part of Letters Patent No. 388,742, dated August 28, 1888.

Application filed April 17, 1888. Serial No. 270,971. (No model.)

*To all whom it may concern:*

Be it known that I, J. FRED THEURER, of Milwaukee, in the county of Milwaukee, and in the State of Wisconsin, have invented certain new and useful Improvements in Devices for Cooling Beer; and I do hereby declare that the following is a full, clear, and exact description thereof.

My invention relates to the cooling of beer, and will be fully set forth hereinafter, and pointed out in the claim.

In the drawings, Figure 1 is an elevation, partly in section, of the preferred means of carrying out my invention. Fig. 2 is a horizontal detail section on the line 2 2 of Fig. 1, and Fig. 3 is a central vertical section of the air-purifying device.

The object of my invention is to cool beer in the process of manufacture in a closed chamber by blasts of purified air admitted thereto while the beer is falling over the cooler; and to that end A represents a closed chamber having, preferably, a glass front, *a a a*, and containing a beer-cooler of any preferred construction—such as that illustrated at B, consisting of a series of horizontal communicating pipes, *b b*, containing the cooling substance—over and around which the beer flows in its downward progress from the pipe C and its branches *c*, situated in the upper part of the chamber A, the flow being regulated by suitable stop-cocks, *d*, in said branches.

D D D represent platforms extending through said chamber to afford means of ready access to all parts of the cooler, which may be two or more stories in height, as shown.

E represents the air-purifying device, and consists of a vessel, preferably of metal, having a sieve or screen, *e*, in its lower part for supporting a mass of charcoal or other filtering substance, *f*, contained in said vessel, while below this is a port, *g*, for the entrance of the air-pipe G from the fan-casing F, and from the bottom of said vessel E there leads a waste-water pipe, H, having a trap-bend, *h*, as shown. From the top of the vessel E there leads an air-pipe, I, and just below this there is supported within the upper part of the vessel E by hangers *i* a tubular ring, J, having a series of depending branches, *j*, terminating in sprinkling-heads *k*, the said ring J communicating with a water-pipe, K, supplied with a suitable stop-cock, L. The upper part of the vessel E is supplied with a man-hole, *m*, closed by a tight door, M. The lower part of said vessel is provided with a water-gage, *n*, on the outside, and the bottom of the air-pipe I is closed, but provided with a waste-water pipe, N, having a suitable goose-neck or trap-bend, as shown, and just above said closed bottom the air-pipe I has a horizontal branch or wind-trunk, O, the ends *o o* of which pass into the chamber A, and said trunk extends entirely around the beer-cooler B, being preferably located around the overflow-trough shown in the upper part of the said beer-cooler, and the said wind-trunk is provided with a series of openings, *p*, in its bottom, the size of which may be regulated at any time by means of slides P.

The fan-casing F contains a blast-fan, the axle Q of which carries a pulley, *q*, which is connected by a belt, S, to pulley *r* on the shafting R, which drives the fan; and T is an air-pipe leading from the outside air to the fan-casing F.

In the upper part of the chamber A there is a ventilator-opening, U, which can be partly closed to any desired point by the damper V.

The operation of my invention will be readily understood from the foregoing description of its construction. The warm beer made flows through pipe C and its branches *c* on top of the beer-cooler B, and over and around the pipes thereof to the usual trough at the bottom of said cooler, and in its descent receives the blast of air from the fan in the casing F through the openings in the wind-trunk O. As the air from said fan-casing enters the port *g* in the lower part of the vessel E, water is admitted through pipe K, ring J, and its branches and sprinkler-heads above the charcoal or other filtering material contained in said vessel E, and said air is forced upward through said filter, being cleansed and cooled in such passage by the filter and water, and hence when it reaches the closed chamber A it is practically pure and keeps the temperature of the closed chamber cool about the beer-cooler, escaping finally through the ventilator-opening U at the top as additional air blown in by the fan takes its place below. In this way contamination from outside impure air is avoided and only purified air reaches the beer flowing over the cooler. The water, after it passes through the filtering material in the air-purifying vessel E, falls to the bottom thereof and passes out through the waste-pipe H, the gage n always showing the quantity of waste-water in the vessel E and the bend h of the pipe H serving as a trap or water seal to prevent the ingress of air into the vessel at this point. Similarly, if any water is carried up into the air-pipe I by the force of the blast from the fan in the casing F, such water will fall to the bottom of said pipe and pass out through the waste-pipe N, which is provided with a similar trap-bend for like purpose as that of the trap-bend h described.

Having thus fully described my invention, what I claim as new, and desire to secure by Letters Patent, is—

In a beer-cooling device, the combination, with a closed chamber, of a beer cooler and beer-supply pipe contained therein, and a wind-trunk surrounding said cooler and provided with openings, and adjustable slides for regulating the size of said openings at will, and means, substantially as described, for forcing cooled air through said wind-trunk and its openings into said closed chamber on both sides of said beer-cooler.

In testimony that I claim the foregoing I have hereunto set my hand, at Milwaukee, in the county of Milwaukee and State of Wisconsin, in the presence of two witnesses.

J. FRED THEURER.

Witnesses:
S. S. STOUT,
GUSTAVE G. PABST.